United States Patent Office 3,165,958
Patented Jan. 19, 1965

3,165,958
DISPENSING APPARATUS FOR WAX-IMPREGNATED MATERIAL
Kelvin G. Anderson, Milton, Ontario, Canada, and Peter P. Spolsino, Revere, Mass., assignors to W. R. Grace & Co., Cambridge, Mass., a corporation of Connecticut
Filed Mar. 14, 1962, Ser. No. 176,056
2 Claims. (Cl. 83—170)

This invention relates to an automatic dispenser for "bone-protective" material suitable for use in meat cutting and packaging establishments.

Although bags and sheet wrappings made of heat-shrinkable plastic have been remarkably successful in protecting meat which is to be refrigerated or frozen, they cannot be used with bone-in cuts of meat such as primal cuts of beef, legs of lamb, hams, lamb chops, pork chops, etc., without the danger that the protruding bones or splinters of bones will puncture and tear the covering. To secure the advantages of packaging such meats in such a tight-clinging, heat-shrunk, and usually "vacuumized" plastic bags, or wrappings, a padding or protection over the protruding bone ends is necessary. Such pads are applied to the bone-in cuts prior to the insertion of the cut into the plastic bag.

As disclosed in the patent to Selby et al., United States Patent No. 2,891,870, dated June 23, 1959, a suitable bone-protective material is cloth, such as cheese cloth, impregnated with a low-melting non-toxic wax. This material possesses distinct advantages over pads such as paper and the like, since it may be molded into place over the bone end and, merely by slapping it or pressing it into place, such molded pads stay in position in the subsequent step of inserting the bone-in meat cut in the plastic covering.

To permit this pad-molding operation, the bone-protective material must be heated to a softened state. Since most meat cutting and packaging operations take place at meat temperatures of from 50° F. to a few degrees below and are conducted in rooms which are maintained at approximately 50° F., the pad stiffens and hardens in contact with the meat almost immediately.

Since no two cuts of meat are of the same size, and since the areas of bone which must be protected by the bone-protective material vary from cut to cut, the use of standard sizes of bone-protective material would be very wasteful. Instead, it is customery to place a dispenser at each packaging station and permit the operator to draw out from the dispenser the amount of material which is necessary to cover the bone.

The machine which is the subject of this invention withdraws from a supply roll amounts of material which vary according to the operator's estimate of the amount needed, tempers the bone-protective material by immersing it in a tank of hot water and finally cuts off the selected length of heat-softened bone-protective material and delivers it in a condition where it may be quickly formed into a pad and applied to the bone end or splinters.

Figure 1:
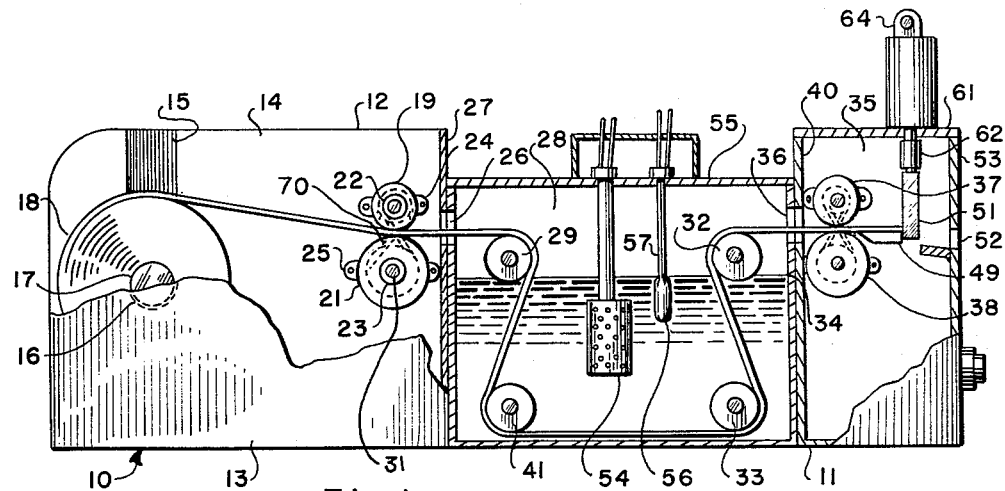
FIGURE 1 is a side elevation of the machine.

Referring to FIGURE 1, the machine 10 comprises what is essentially a compartmented sheet metal box having a base 11 and upstanding side walls 12 and 13. The side walls of the rear compartment 14 are slotted at 15 and 16 to receive the axle 17 of a supply roll of bone-protective material 18. The web unwinds from the top of the supply roll and is led between a pair of pull rollers 19 and 21 journalled in the bearings 22 and 23. These in turn are mounted in the bearing housings 24 and 25 fastened to the side walls 12 and 13. The web then passes through the horizontal slot 26 which is cut in the forward end wall 27 of compartment 14 and enters the hot water compartment 28.

In this compartment, the web passes over a set of four idler rollers 29, 41, 33, and 32 by which the web is led downwardly beneath the water level 34, then forwardly adjacent the bottom of the water compartment, and then upwardly out of the water bath and into the third compartment 35, passing through the slot 36, cut in the forward tank wall 40. The web then passes between a set of take-up rolls 37 and 38 which are journalled on the walls 12 and 13 in the same manner as are rolls 19 and 21.

Figure 2:
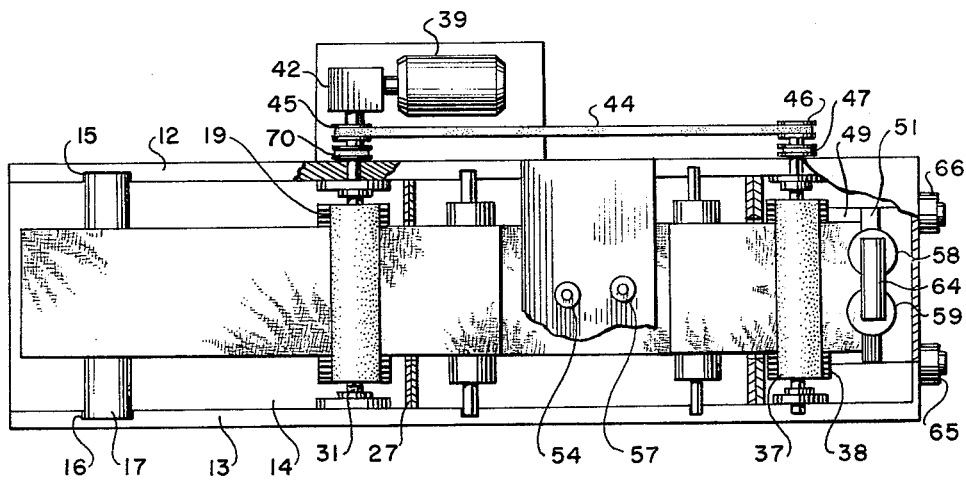
FIGURE 2 is a top plan view with the covers removed to show the location of the rolls and cutter knife.

As shown in FIGURE 2, the rolls receive their power from the electric motor 39 which is appropriately connected to the roll shaft 31 of the bed roll 21. Roll 21 drives roll 19 through the belt 70. A belt 44 passing over the belt pulley 45 fastened to the shaft of roll 21 conducts power to the shaft of the forward driven roll 38 through the pulley 46 and this in turn drives upper roll 37 through the belt 47. Preferably, the upper rolls 19 and 37 are made of rubber, while the drive or bed rolls 21 and 38 are of the serrated disc type.

The web then passes over the bed knife 49 and under the vertically reciprocating knife 51. It passes out of the machine through a slot 52 cut in the forward wall 53 of the compartment 35.

Water in the water compartment 28 is heated by an immersion type electrical heating coil 54 which is suspended from the water compartment cover 55. The water temperature is sensed and controlled by the immersion bulb 56 of heater control thermostat 57 which is attached to cover 55. Two air cylinders 58 and 59, mounted on the top wall 61 of forward compartment 35 having their piston rods 62 directly connected to knife 51, reciprocate the knife. These cylinders are actuated by compressed air received from a factory source and are controlled by an electro-pneumatic spool valve 64 which is tripped by the switch button 65. The electrical and pneumatic connections are conventional and are not shown.

It should be noticed that the pull on the web is accomplished by the rear set of rolls which operate on the web while it is chilled by the cool atmosphere of the cutting and packing room. The forward set of rolls which operate on the web after it has been heat-softened by the hot water, merely prevent slack from accumulating along the pathway of the web. Were the web-pulling function left to the action of the forward set of rolls alone, considerable scuffing of the heat-softened wax would occur and shortly, the rolls would begin to slip. By driving the web forward from a point where the web is stiff and the wax is hard, rolls 19 and 21 do not slip nor does the hard wax pile up on their surfaces.

To operate the machine, the operator touches spring-released switch button 66. This completes the electric circuit to the motor 39 and as long as the button is held down, heat-softened bone-protective webbing issues from the machine. When enough of the web has emerged through the slot 52, the operator releases button 66 and touches switch button 65, actuating the cut-off knife. The cut-off portion is then folded into a pad or molded around the projecting bone. It hardens and adheres immediately because the wax is rapidly chilled by the cool meat cut.

The machine operates rapidly and dependably. Pile-up of the web or slipping of the rolls on the softened wax is entirely eliminated.

We claim:

1. A sheet delivery and cut-off device adapted to deliver variable lengths of wax-impregnated bone-protecting material from a web thereof, comprising a base, side walls, end walls, and interior partitions together forming a compartmented box-like structure, means to support a supply-roll and means to support a transversely arranged pair of pull rolls in the rear compartment, means for maintaining the wax-impregnated material in said rear compartment below the softening temperature of said wax, roll means to guide and to submerge the web through liquid contained in the second compartment, means to heat said liquid above the softening temperature of said wax, a pair of take-up and delivery rolls, a bed-knife and a reciprocating cut-off knife transversely arranged in a third compartment, power means to reciprocate the knife, power transmitting means arranged to drive both roll pairs simultaneously and at identical surface speeds, and means to power the device.

2. The device of claim 1 wherein said supply roll and pull rolls are disposed in a room maintained at a temperature below the softening temperature of said wax.

References Cited by the Examiner
UNITED STATES PATENTS

| | | | |
|---|---|---|---|
| 631,742 | 8/99 | Gardner | 83—15 |
| 1,699,507 | 1/29 | Spiess | 226—4 |
| 1,845,317 | 2/32 | Moone | 118—419 |
| 1,897,654 | 2/33 | Pfeiffer | 226—4 |
| 2,319,040 | 5/43 | Conklin | 83—15 |
| 2,331,230 | 10/43 | Rippl et al. | 83—169 |
| 2,341,358 | 2/44 | Brow | 83—170 |
| 2,519,701 | 8/50 | Richardson | 83—436 |
| 2,551,811 | 5/51 | Mueller | 83—170 |
| 2,656,063 | 10/53 | Kafka | 226—191 |
| 2,747,540 | 5/56 | Moore | 118—41 |
| 2,826,167 | 3/58 | Cohn | 118—419 |
| 2,891,870 | 6/59 | Selby et al. | 99—174 |
| 2,993,400 | 7/61 | Glenton | 83—15 |

ANDREW R. JUHASZ, *Primary Examiner.*

CARL W. TOMLIN, *Examiner.*